Sept. 30, 1952      LE ROY S. DE MART      2,612,044
REMOTE WATER LEVEL INDICATOR
Filed July 16, 1948      3 Sheets-Sheet 1
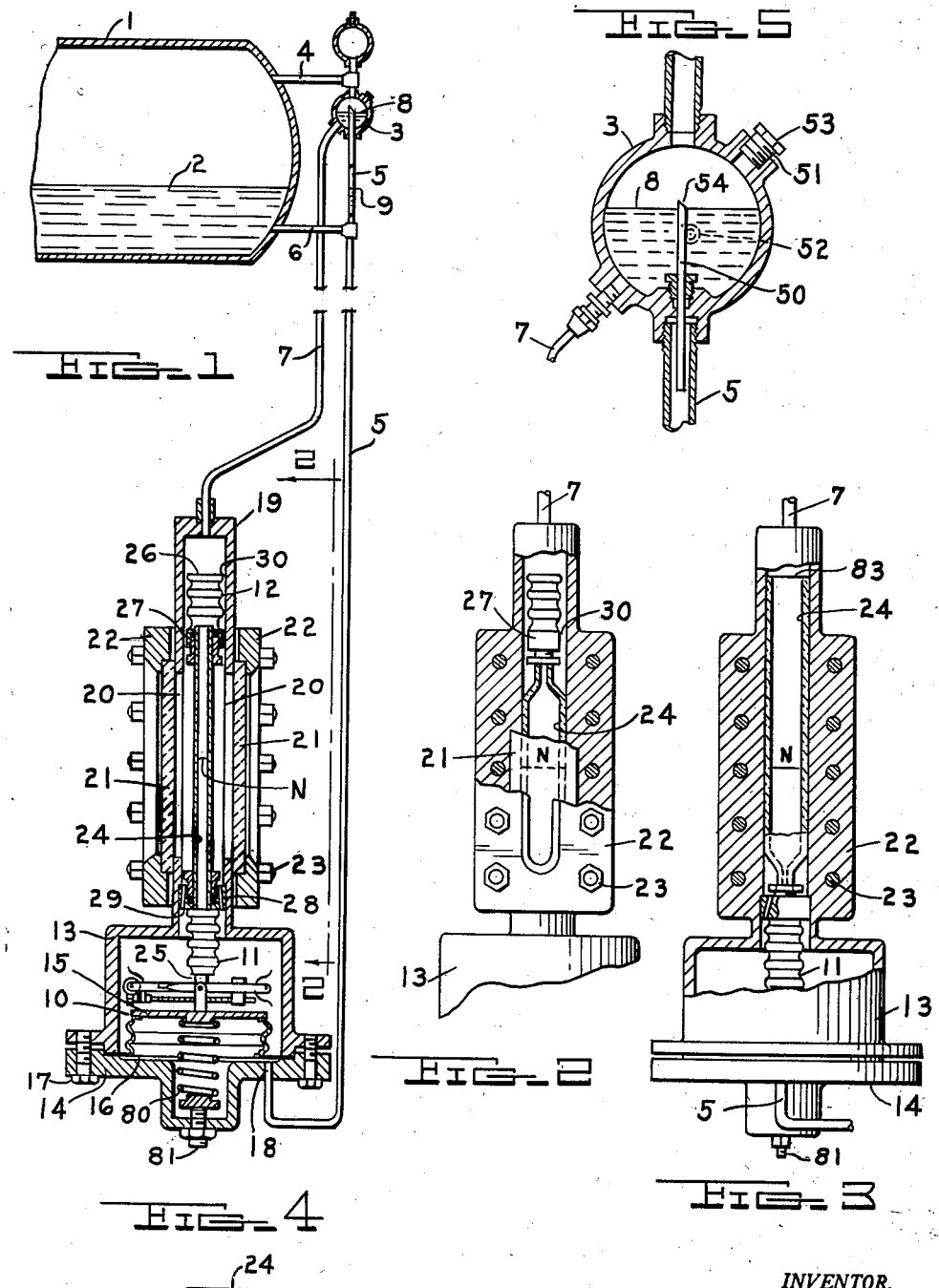
INVENTOR.
LE ROY S. DE MART
BY
ATTORNEYS Sept. 30, 1952 LE ROY S. DE MART 2,612,044
REMOTE WATER LEVEL INDICATOR
Filed July 16, 1948 3 Sheets-Sheet 2
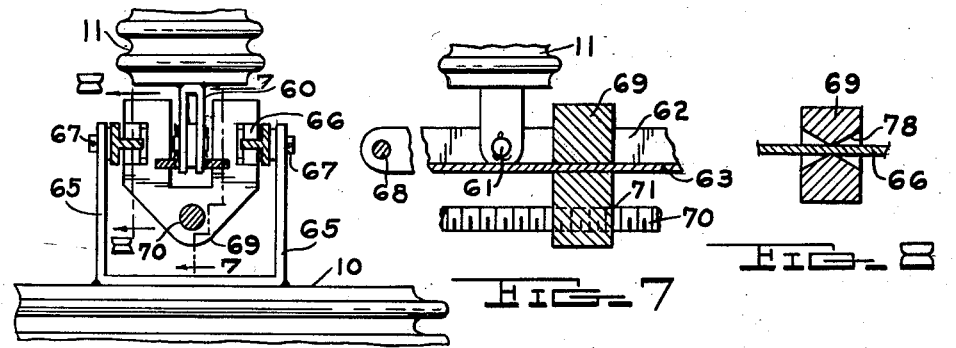
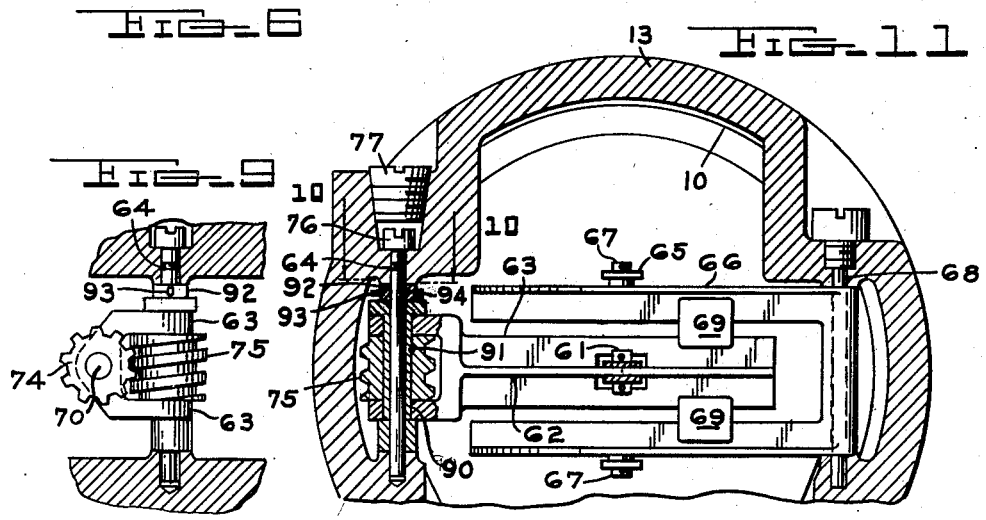
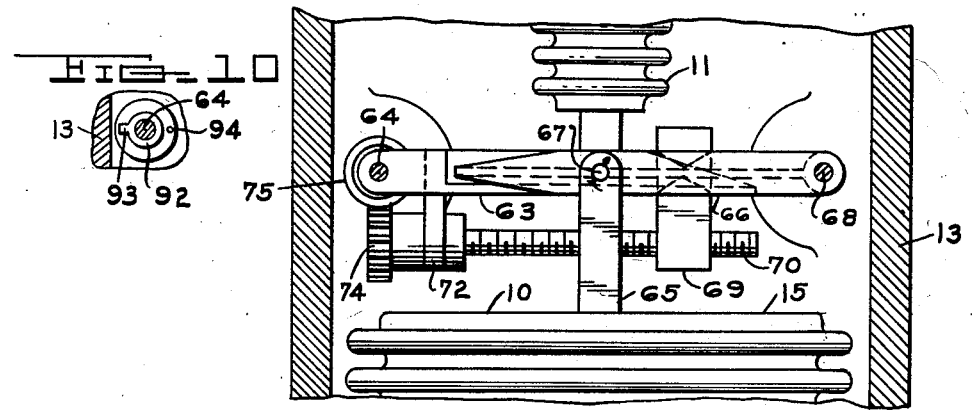
INVENTOR.
LE ROY S. DE MART
BY
Barnes, Kisselle, Laughlin & Reisel
ATTORNEYS Sept. 30, 1952     LE ROY S. DE MART     2,612,044
REMOTE WATER LEVEL INDICATOR Filed July 16, 1948     3 Sheets-Sheet 3

INVENTOR.
LE ROY S. DE MART
BY
Barnes, Kisselle, Laughlin & Raisch

Patented Sept. 30, 1952

2,612,044

UNITED STATES PATENT OFFICE 2,612,044

REMOTE WATER LEVEL INDICATOR

Le Roy S. De Mart, Detroit, Mich., assignor to Diamond Power Specialty Corporation, Detroit, Mich., a corporation of Michigan Application July 16, 1948, Serial No. 39,075

19 Claims. (Cl. 73—299)

This invention relates to a remote liquid level indicator.

In steam generating plants the boiler drum and boiler water gauge are often located high above the operating floor. Because of this the boiler water gauge cannot be read from the operating floor and the necessity for a dependable auxiliary check of boiler water levels has been recognized for many years.

It is an object of this invention to produce a remote liquid level indicator for a steam boiler which can be located at any desired place, such, for example, as on an instrument panel at eye level above the operating floor where it can be conveniently and easily read.

It is also an object of this invention to produce a remote liquid level indicator which is simple in structure, easy to install, free from any moving parts which require stuffing boxes and which is positive and dependable in action.

In the drawings:

Fig. 1 shows my remote liquid level indicator connected to a boiler with the indicating mechanism in section.

Fig. 2 is a vertical section through the indicating mechanism along line 2—2 of Fig. 1 taken at right angles to the sectional showing in Fig. 1.

Fig. 3 shows a modified form of indicating device.

Fig. 4 is a section through the tube containing the indicating liquid.

Fig. 5 shows a modified form on the constant liquid level chamber.

Fig. 6 is a sectional view showing the linkage between the two lower bellows.

Fig. 7 is a section along the line 7—7 of Fig. 6.

Fig. 8 is a section along the line 8—8 of Fig. 6.

Fig. 9 is a detail of the worm mechanism for adjusting the pivot between the links.

Fig. 10 is a detail of the adjustment collars.

Fig. 11 is a top plan view of the linkage between the two bottom bellows, and

Fig. 12 is a side elevation of the same.

Figure 13:
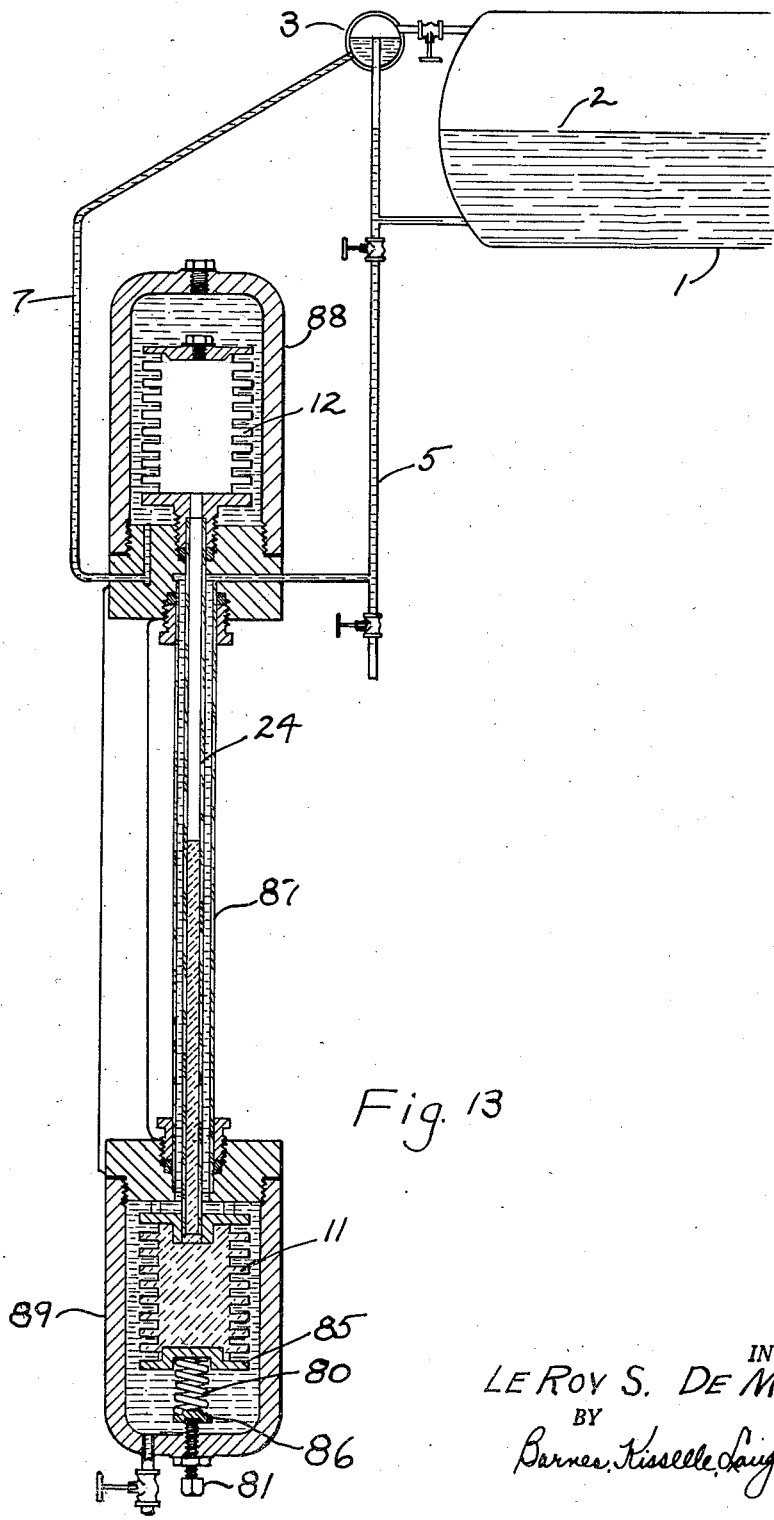
Fig. 13 shows in section a modified form of my remote liquid level indicator.

Referring more particularly to the drawings the boiler drum is designated 1, the water or liquid level in the boiler 2, the constant head chamber 3 connected to the boiler 1 above the water level 2 by pipe 4. The constant head chamber 3 is provided with an overflow pipe 5 which is connected by pipe 6 with boiler drum 1 below water level 2. A pipe line 7 is connected into the bottom of the constant head chamber 3. Pipe lines 5 and 7 connect the constant head chamber with the indicator as described below. The steam from boiler 1 passes through pipe 4 and condenses in chamber 3. The overflow pipe 5 maintains the water level 8 in chamber 3 constant as indicated. The level of the water in pipe 5, as indicated at 9, will always be the same as water level 2 in the boiler drum 1. The head of water in pipe line 5 will vary as the water level 2 in drum 1 varies. Thus, there will be a pressure differential between the constant head of water in line 7, chamber 3 and the varying head of water in line 5 and drum 1. This pressure differential is used for operating the level indicator.

The level indicator comprises three resilient diaphragms preferably in the form of bellows such as the metal bellows commonly sold under the trade name "Sylphon." These bellows are designated 10, 11 and 12.

Compression spring 80 is positioned within bellows 10 and between removable plate 14 and the inner face of wall 15. The compression of spring 80 can be adjusted by adjusting screw 81.

Bellows 10 is mounted in housing 13 having a removable bottom 14. The closed end of bellows 10 is designated 15 and the circumferential flange 16 at the open end of the bellows is clamped between the removable plate 14 and housing 13. Bolts 17 secure plate 14 to housing 13. Pipe line 5 communicates through opening 18 with the interior of bellows 10.

Housing 13 has a hollow extension 19 provided with opposed openings 20 in its side walls which are closed by windows 21 of glass or other transparent material. The glass windows 21 are mounted in frame members 22 and frame members 22 are secured by bolts and nuts 23 to the housing extension 19. Bellows 11 and 12 are fixed within housing 13 and the interior of bellows 11 and 12 communicate with each other through glass tube 24. The closed end 25 of bellows 11 is operatively connected to the closed end 15 of bellows 10 through a linkage described below. The closed end of bellows 12 is designated 26.

Bellows 12 is supported in housing extension 19 by member 27 which is fixed on tube 24. Bellows 11 is fixed in housing 13 by member 28 which is fixed into the housing extension 19. Member 28 is provided with passageways 29 therethrough and member 27 has a clearance as at 30 with the inside wall of housing 19 so that the water or liquid (the level of which is being indicated) completely fills the inside of housing 13 and housing extension 19 outside of bellows 10, 11 and 12 and outside of tube 24 and line 7.

Bellows 11 and 12 and tube 24 will be completely filled with an indicating liquid. Bellows 11 and tube 24 up to the normal (N) mark will be filled with a liquid of one color, preferably green, and bellows 12 and tube 24 down to the normal (N) level will be filled with a liquid of another color, such as red. The green liquid can be a hexylresorcinal solution colored with green dye and the red liquid can be benzene colored with a red oil soluble dye such as Sudan #3 red which is not soluble in water. Sudan #3 red is purchasable in the open market and manufactured by the Aniline Chemical Company. The important point is that the red and green liquids should be immiscible, non-corrosive and non-solidifying at normal temperature. Thus the red and green liquids should have different specific gravities. Although other colors will do equally as well, the topmost liquid should preferably be red to represent the space occupied by steam in the boiler drum and the bottom liquid preferably is green to represent the space occupied by water in the boiler drum. As shown, the level of the green liquid or the dividing line between green and red liquids is indicated at N which is normal. If the water level 2 in drum 1 rises, then the dividing line between red and green liquids or the level of the green liquid in tube 24 will correspondingly rise above the normal line. If the water level 2 falls, then the level of the green liquid in tube 24 will correspondingly fall and more red liquid will be visible thereby denoting danger. The readings of the liquid level in tube 24 can be made easily through the glass windows 21 which may have graduations thereon to indicate high, normal, and low levels of the water in boiler 1.

A linkage is provided between the top of lower bellows 10 and the bottom of bellows 11 for increasing or decreasing the movement of the indicating liquid in tube 24 in relation to the movement of the bottom bellows 10 for the movement of the liquid being measured or indicated. A bifurcated arm 60 is fixed to the bottom of bellows 11 and is pivotally connected by pin 61 to upstanding flange 62 of lever 63 which is pivoted at one end on shaft 64 which is journalled in housing 13. Lever arm 63 is preferably arranged to pivot about a horizontal axis or shaft 64. Upper wall 15 of lower bellows 10 has fixed thereto a pair of arms in the form of a U bracket 65 which are pivoted to a U type lever 66 by means of pins 67. Lever arm 66 is pivotally supported on housing 13 by shaft 68 so that it too preferably pivots about a horizontal axis. A fulcrum member 69 is slidably mounted upon the horizontal flanges of lever arm 63 and is adjustable therealong by screw 70 which has a threaded fit in opening 71 in member 69. Screw 70 is journalled in bearing support 72 fixed on arm 63 and a worm gear 74 is fixed to the end of screw 70. Worm gear 74 meshes with worm 75 which is fixed on sleeve 90 by pin 91. Lever arm 63 is free to pivot on sleeve 90 which in turn is free to pivot on shaft 64. Shaft 64 has fixed thereon collar 92 with projecting pin 93. When shaft 64 is turned with a screw-driver or such, pin 93 contacts pin 94 to turn sleeve 90, worm 75 and worm gear 74 and screw shaft 70 to move fulcrum member 69. During indicating operation of the apparatus pin 93 is turned 180° away from pin 94 so that sleeve 90 is free to move with lever arm 63 and worm 75. If pins 94 and 93 were in contact during indicating operation, worm 75 would be held from turning; worm wheel 74 would experience a slight turning action as it changed its location on the periphery of the worm 75 with each movement of lever 63. Shaft 64 is provided with a head 76 provided with a slot therein so that it can be engaged by a screw driver and rotated whenever screw plug 77 is removed.

Fulcrum member 69 is provided with two pairs of opposed knife edges 78 which engage the top and bottom side of the two arms of lever 66. Pivot pins 64 and 68 are located equidistant from pivot pins 61 and 67. If knife edges 78 are axially aligned with axes 61 and 67, then each given movement of arm 66 will cause an identical movement of arm 63, that is, axes 61 and 67 will move up and down in unison and the same distance each time bellows 15 expands or contracts. If screw 70 is rotated to move fulcrums 69 to the right of axes 61, 67, as shown in Figs. 11 and 12, then each time arm 66 rotates through a given arc, lever arm 63 will rotate through a smaller or lesser arc, and vice versa if fulcrum 69 is moved to the left of axes 61 and 67 or between these axes and pin 64, then each time arm 66 moves through a given arc arm 63 will move through a greater arc. It will be noted that the adjustment of this linkage can be made while the indicating unit is in operation or under operating pressure by simply removing plug 77 and turning shaft 64 by means of a screw-driver. If one adjusts fulcrum 69 to the left, the travel of the indicating liquid in tube 24 will increase upon an expansion or contraction of bellows 10 and if fulcrum 69 is adjusted to the right, this travel will be decreased for any given expansion or contraction of bellows 15.

In Fig. 5 I have shown an arrangement for adjusting the liquid level 8 in the constant head chamber 3. This arrangement comprises a slidable extension 50 for pipe line 5 which can be adjusted by passing a hooked instrument through opening 51 and contacting extension 50 to raise or lower the same. The liquid level will rise or fall to the level of the upper open end 54 of extension 50. 52 is a hook eye on tube 50 into which adjustment hook can be secured to raise or lower slidable extension 50. Opening 51 is closed by a screw plug 53.

The operation of the liquid level indicator is as follows: The liquid level 8 in chamber 3 is constant. The constant level water in chamber 3 also completely fills line 7 and housing 19 and 13 exteriorly of the bellows and tube. Water from the boiler 1 completely fills pipe 6, line 5 to liquid level 9 and the interior of bellows 10. The steam pressure on liquid levels 8 and 9 is the same so the only pressure differential is a hydrostatic pressure differential between the constant head of water in chamber 3 and the variable head of water in pipe 5. As the water level 2 in drum 1 rises, a corresponding and equal rise of water level in pipe 5 occurs. The increased head of water in pipe 5 causes bellows 10 to expand upwardly thereby contracting upwardly bellows 11 which automatically raises the level of the green and red liquids in tube 24 to indicate the rise in water level in drum 1. If the water level 2 in drum 1 falls, a corresponding fall in the water level in pipe 5 occurs, thus increasing the pressure differential between heads 8 and 9. This pressure differential tends to collapse bellows 10 an amount directly proportional to the differential pressure thereby expanding bellows 11 downwardly and causing a proportional fall of the green and red liquids in tube 24, thus indicating a fall in the liquid level 2 in drum 1. Thus, it liquids. Hence, if I substitute indicating liquids having heavier specific gravities, then screw 81 is turned upwardly to increase the compression of spring 80 to thereby locate the junction of the indicating liquids at its normal mark (N), assuming, of course, that the level 2 of the liquid in drum 1 is normal. If an indicating liquid having a lighter specific gravity is substituted, then screw 81 will be turned downwardly to decrease the compression of spring 80 and thereby adjust the junction of the indicating liquids to the normal calibration point N.

Since the indicating liquid is surrounded by boiler liquid or liquid from the constant level chamber 3, this prevents any loss of indicating liquid even though the seals for the tube 24 may be slightly leaky because there is a hydrostatic balance between the indicating liquid and the liquid surrounding tube 24 and the several bellows. Due to this hydrostatic balance there is no tendency in case of a slight leak for liquid to flow either in or out of the bellows and indicating tube 24.

This application is a continuation-in-part of my application Serial No. 531,077, filed April 14, 1944, now abandoned.

The modified form of liquid level indicator shown in Fig. 3 is the same as the principal form of the invention shown in Figs. 1, 2, 4 and 6 to 12 except that glass tube 24 is open at its upper end 83 and bellows 12 has been omitted. The water in line 7 and extension 19 therefore forms the second indicating liquid.

In my remote liquid level indicator the inherent resilience of the bellows plays an important part in the functioning of my level indicator. Bellows 10, Fig. 1, and bellows 11 and 12, Fig. 13, are resilient corrugated tubular metal bellows, such as are commonly sold under the trade-name "Sylphon," and these bellows are shown by way of description only and as illustrative of the expansible and contractible means that I can employ in my level indicator. Instead of a resilient corrugated bellows, I can obtain the same inherent resilience by using a canvas or flexible bag with a compression spring therein or an elastic rubber diaphragm or a cylinder with a piston therein which is backed up or loaded by means of a spring. The important thing is that the expansible and contractible member should resist change in volume from its normal unstressed condition in response to a change in the difference between the pressure head of the variable level liquid body 2 and the constant level liquid body in chamber 3.

In the form of indicator shown in Fig. 1 it is only necessary that the bellows 10 be inherently resilient and it is not necessary that bellows 11 and 12 have any inherent resilience. In the form shown in Fig. 13 it is only necessary that one of the bellows 11 and 12 be inherently resilient.

In fabricating my level indicator, bellows 11, 12 while in their normal unstressed condition and tube 24, Fig. 4, will be completely filled with the indicating liquids before the indicator is connected through lines 5 and 7 with boiler 1. In the form shown in Fig. 13, bellows 11 and 12 while in their normal unstressed condition and tube 24 likewise will be completely filled with indicating liquids before the indicator is connected to the boiler drum. The indicator will be installed in a vertical position, that is, tube 24 will extend in a substantially vertical or up and down position with bellows 11 and 12 positioned one above the other at either end of the tube. When the indicator is thus set up in a vertical position and before it is attached to the boiler, the weight of the liquid will cause lower bellows 11 to expand and upper bellows 12 to contract. Thus, the weight of the liquid will be supported entirely by the lower bellows 11 and the upper bellows 12. If the upper bellows 12 is simply a flexible canvas sack and non-resilient, then the entire weight of the liquid will be supported by the lower bellows 11.

In the form shown in Fig. 1, when the gauge is set upright the weight of the liquid will be carried also by bellows 10, 11 and 12, bellows 12 tending to contract, bellows 11 tending to expand, and bellows 10 tending to contract. Now, when the gauge is connected through pipe lines 5 and 7 with the boiler drum and with chamber 3, these bellows will be acted upon by the difference in pressure between the head of liquid in boiler drum 1 and the head of liquid in chamber 3. In the form shown in Fig. 1 this differential pressure head will cause bellows 10 to expand, bellows 11 to contract and bellows 12 to expand until a position of equilibrium is reached between these resilient bellows and the unbalanced liquid in the apparatus. In the form shown in Fig. 13 this differential pressure will cause bellows 11 to contract and bellows 12 to expand until equilibrium between the resilient bellows and the unbalanced liquid is reached. Thereafter any change in the level 2 of the liquid in drum 1 will be reflected in a proportional change of position of the junction between the two indicating liquids in tube 24. Thus, it will be seen that the inherent resilience of the bellows plays an important role in the operation of my apparatus.

The operation of this water level indicator is predicated on the principle that a given head of liquid exerts a pressure at a given depth in all directions regardless of the shape of the container. That pressure exerted against a given movable area will move that area a set amount depending on the resistance set up within or behind the given movable area. In my liquid level indicator the resistance set up is the inherent resistance of a bellows and the bellows will collapse or expand a measured amount depending on the pressure applied by the head of liquid. The measured movement of the bellows causes a volume change in the bellows and thus a measured amount of liquid in the bellows is forced out or drawn in depending on the direction of the applied pressure. The liquid forced out of the bellows is moved through the straight vertical viewing tube having a cross sectional area or volume directly related to the volume of the bellows. Thus, for a given head of liquid a given pressure is exerted and moves the bellows a given amount causing a related volume change and moving the indicating liquids in the straight vertical viewing tube a directly related amount. If the head of liquid varies considerably, then changing the relation between the volume of the bellows and the volume of the viewing tube, keeping the length of the tube constant, will control the liquid movement in the tube.

It is difficult to obtain bellows having identical operating characteristics. For that reason a spring 80 and a spring adjustment 81 has been provided in the indicator. The manufacture of springs is an exact science and any number of springs can be made having identical characteristics. Thus, we have in the gauge a bellows having a pressure area on which the pressure will be seen that the bellows and liquid in tube 24 respond to an increase in the pressure differential between the constant head of water in chamber 3 and the head of water in boiler 1 or pipe 5 to indicate a fall in the water level in boiler 1 and respond to a decrease in the pressure differential between these two heads of water to indicate a rise in the water level in boiler 1. The calibrations on the windows 21 cooperate with the junction point of the red and green liquids in tube 24 to give a visual and accurate indication of the level of the water in the boiler drum at all times. Tube 24 is calibrated so that the travel of the indicating liquid in tube 24 bears a direct relation to the movement of the bellows 10. Bellows 10 moves in direct relation to the differential pressures. Thus it will be seen the indicating liquid has a travel in tube 24 corresponding directly to the rise and fall of the liquid in the drum.

From the above it is evident that I have produced a simple, efficient, durable and reliable remote water level indicator which is sealed within a housing and therefore free from any tendency toward leaks which might be caused by moving parts. All working parts are in a state of pressure balance except for the low differential pressure acting on them and can be of standard light weight construction.

When bellows 11 is contracted through the expansion of bellows 10, the liquid contained in transparent tube 24 and bellows 11 and 12 will cause bellows 12 to expand and vice versa, as bellows 11 expands then bellows 12 contracts.

Since both the constant and variable heads of water or liquid are subjected to the steam pressure in drum 1 therefore bellows 10 is actuated solely by a change in the difference in pressure between the constant and variable heads of liquid. Consequently my level indicator will operate equally well and accurately under all pressure conditions, that is, my remote liquid level indicator can be used to indicate the water level of a boiler operating at, for example, 200 pounds per square inch steam pressure or on a boiler operating at 2500 pounds per square inch steam pressure. The readings in each case will be accurate.

The sealed in construction I employ permits keeping the boiler liquid entirely separate from the indicating liquid in the gauge. Impurities in the boiler liquid cannot contaminate or cloud up the indicating liquid, or the viewing windows. Neither can sediment in the boiler liquid settle in the indicating liquid chamber and cause a false water level indication. It is possible and a good policy to blow down the connecting tubes between the boiler drum and the indicator at intervals to remove all sediment and foreign matter carried there by the boiler liquid. The blow down can be accomplished without loss of indicating liquid in my gauge.

My indicating liquid need never be cleaned or replaced unless the gauge is damaged, or the glass tube broken and leakage occurs.

Rapid liquid level changes in the boiler drum has no detrimental effect on my indicating liquid, due to the sealed in feature, it cannot be drawn out of the gauge by such action. For the same reason I need no safety reservoir for retaining the liquid in the gauge.

Two calibrated tubes are not required for the operation of my indicator, as there is no balancing of one column of liquid in one calibrated tube against a second column of liquid in a second calibrated tube. My gauge requires only that the diaphragm have a calibrated travel for the pressures exerted by the differential pressures of the liquid levels and that the glass tube have a definite area relation to the volume displacement of the bellows.

Indicating liquid of any desired specific gravity can be used in the principal form of my invention—it need bear no relation to the specific gravity of the liquid in the boiler drum.

No skilled workman is required for installation of the indicator gauge. The sealed in construction permits filling the gauge when built. Thus, no liquid will evaporate in transit. None will get spilled at the time of installation, and no error in indication will occur due to possible error in amount of indicating liquid installed in the gauge.

The indicator gauge may be tilted, upset, laid down, or turned upside down without loss of liquid. It can also be installed upside down and obtain the same resulting indication.

My indicating gauge can be installed any place below the top boiler drum outlet 4, but most usually will be located below outlet 6.

Rocking the gauge from side to side as would occur on board ship has no detrimental effect on the steady accurate reading of the indicator. The indicating liquid does not bob up and down as would occur in a U tube type of indicator.

Tilting the gauge at an angle from its original installation location does not vary the location of the indicating liquid for any set reading of liquid level.

Completely surrounding the indicating liquid container with the boiler liquid in the gauge definitely eliminates any possibilities of leakage of the indicating liquid. There is a state of static balance between the indicating liquid and the boiler liquid and very light seals will suffice. This eliminates a great danger in existing gauges where the indicating liquid can be forced out of the gauge through cracks in the welded joints or fittings and thus cause a false liquid level reading and resulting in damage to the boiler.

The form shown in Fig. 13 differs from the principal form of the invention primarily in that bellows 10 has been omitted and the linkage between bellows 10 and bellows 11. In this form of the invention compression spring 80 acts directly between the bottom 85 of bellows 11 and plate 86 which is supported on the upper end of adjusting screw 81. In this form of the invention glass tube 24 is surrounded by glass tube 87. In this form of the invention the liquid within constant head chamber 3 will be present only in pipe line 7 and in housing 88 which surrounds bellows 12. The boiler liquid will be present in boiler drum 1, line 5, tube 87 and housing 89 which communicates with tube 87 and surrounds bellows 11. The head of water in pipe line 5 will vary as the water level 2 in drum 1 varies. The head of water in line 7 will be constant. Thus, there will be a pressure differential between the constant head of water in line 7, chamber 3, housing 88 and the varying head of water in drum 1, line 5, tube 87 and housing 89. This pressure differential is utilized to actuate bellows 11 and 12 and raise or lower the junction of the liquid in tube 24 to indicate the level of liquid in boiler drum 1.

The use of an adjustable compression spring 80 with bellows 10, Fig. 1, and bellows 11, Fig. 13, makes my level indicator usable with indicating liquids having different specific gravities. Spring 80 counterbalances the weight of the indicating heads operate and a spring providing and controlling the accurately measured deflection of the bellows to force a measured amount of indicating liquid into the calibrated area of the transparent indicating tube.

I claim:

1. A remote liquid level indicator for a body of liquid having a variable level comprising a chamber, a conduit connecting said chamber with said body of liquid, an inherently resilient expansible and contractible means positioned within said chamber whereby the said means is subjected to a variable pressure corresponding to the head of the said liquid body, a second chamber containing a body of liquid having a substantially constant head, a second expansible and contractible means positioned in said second chamber, the said second means being subjected to the substantially constant head of the said body of liquid in the second chamber, a vertically arranged conduit including a window directly connecting the interiors of said two expandible and contractible means, two immiscible liquids filling said means and conduit with the junction line of said liquids visible through said window whereby as the level of the liquid body varies the first expansible and contractible means responds to the change in pressure and actuates said indicating liquid to vary the position of the junction line between the two immiscible liquids in accordance with the variation and level of said liquid body.

2. The combination set forth in claim 1 wherein the expansible and contractible means are positioned one above the other and the conduit extends vertically between the two expansible and contractible means whereby the weight of the indicating liquid is supported by the lowermost of the said expansible and contractible means.

3. The combination set forth in claim 2 wherein the second expansible and contractible means is inherently resilient.

4. A remote liquid level indicator for a body of liquid having a variable level comprising a substantially straight vertically arranged transparent conduit, expansible and contractible means communicating with the opposite ends of said conduit, two immiscible liquids filling the space enclosed by the said expansible and contractible means and the conduit, and inherently resilient expansible and contractible means operatively connected with said first mentioned expansible and contractible means so that said first mentioned expansible and contractible means are actuated to shift the junction line between the two liquids an amount proportional to the movement of the inherently resilient expansible and contractible means, said inherently resilient expansible and contractible means being subjected on the one side to the pressure of the head of the liquid body having a variable level and subjected on the other side of the head of a body of liquid having a substantially constant level and subjected to the same pressure as the pressure on the body of liquid the level of which is being indicated whereby as the level of the one liquid body varies the inherently resilient expansible and contractible means responds to the difference in pressure between the constant and variable heads of the liquid to actuate said first mentioned expansible and contractible means and the indicating liquids in said conduit to vary the position of the junction line between the two immiscible liquids in proportion to the variation in said difference between the constant and variable pressure heads.

5. The combination set forth in claim 4 wherein the inside of said inherently resilient expansible and contractible means is subjected to the pressure of the liquid body having a variable level.

6. The combination claimed in claim 4 wherein a housing and a second transparent conduit surround the first mentioned conduit and said first and second expansible and contractible means and the space between the two conduits and between the housing and the first and second expansible and contractible means is filled with and communicates with the liquid from one of said bodies of liquid.

7. A remote liquid level indicator for a body of liquid having a variable level comprising a housing, a conduit connecting said housing with said body of liquid, an inherently resilient expansible and contractible means positioned within said housing and subjected on one side to the variable pressure head of said liquid body, a chamber containing a body of liquid having a substantially constant head, a second conduit connecting said chamber with said housing whereby the other side of said expansible and contractible means is subjected to the substantially constant head of the said body of liquid in said chamber, a second expansible and contractible means within said housing and operatively associated with said first expansible and contractible means, a transparent housing communicating with, and in liquid-tight relation with, the said second expansible and contractible means, said transparent housing being enclosed within said first housing and said first housing having a transparent portion through which the transparent housing is visible, two immiscible liquids, the combined volumes of which fill said second expansible and contractible means and the said transparent housing with the junction line of the said liquids visible through said transparent housing and movable in response to actuation of said second expansible and contractible means whereby said inherently resilient expansible and contractible means responds to the difference between said pressure heads as the level of the one body of liquid varies to actuate said second expansible and contractible means and the indicating liquids to vary the position of the junction of the two immiscible liquids in said transparent housing to indicate the level of the variable level liquid body.

8. In a remote liquid level indicator of the type which responds to a difference in the pressure heads between a variable level liquid body and a constant level liquid body, a substantially vertically positioned transparent tube, two immiscible liquids filling said tube and having their junction line between the ends of the tube, and an inherently resilient expandible and contractible means subjected on the one side to the pressure of the constant level liquid body and on the other side to the pressure of the variable level liquid body, said inherently resilient expandible and contractible means being positioned below and supporting the weight of the said two immiscible liquids in said transparent tube, the said inherently resilient expandible and contractible means responding to a difference in said pressure heads to vary the position of the junction of the two immiscible liquids in said transparent tube to indicate the level of the variable level liquid body, and a housing surrounding said expandible and contractible means and said transparent tube, said housing having a transparent portion adjacent said transparent tube to enable viewing the junction of the two immiscible liquids in said tube, said housing being in communication and filled with the liquid of one of said bodies of liquid.

9. The combination claimed in claim 8 wherein the expandible and contractible means has a greater cross sectional area than that of the transparent viewing tube whereby any linear movement of the expandible and contractible means causes a correspondingly greater linear movement of the indicating liquid in said transparent tube.

10. The combination set forth in claim 9 wherein the inherently resilient expandible and contractible means is a corrugated thin wall metal bellows.

11. In a remote liquid lever indicator of the type which responds to a difference in the pressure heads between a variable level liquid body and a constant level liquid body, a substantially vertically positioned transparent tube, two immiscible liquids filling said tube and having their junction line between the ends of the tube, and an inherently resilient expandible and contractible means subjected on the one side to the pressure of the constant level liquid body and on the other side to the pressure of the variable level liquid body, said inherently resilient expandible and contractible means being positioned below and supporting the weight of the said two immiscible liquids in said transparent tube, the said inherently resilient expandible and contractible means responding to a difference in said pressure heads to vary the position of the junction of the two immiscible liquids in said transparent tube to indicate the level of the variable level liquid body, and a housing surrounding said transparent viewing tube and said inherently resilient expandible and contractible means, said housing being in communication and filled with the liquid of one of said bodies of liquid and having a transparent portion through which said viewing tube is visible.

12. The combination set forth in claim 11 wherein the transparent housing is in communication with said constant level liquid body and filled with liquid from said body whereby the liquids within the housing and within the transparent tube are in substantially hydrostatic balance.

13. A remote liquid level indicator for a body of liquid having a variable level comprising a housing, a conduit connecting said housing with said body of liquid, expansible and contractible means positioned within said housing and subjected on one side to the variable pressure head of said liquid body, a chamber containing a body of liquid having a substantially constant head, a second conduit connecting said chamber with said housing whereby the other side of said expansible and contractible means is subjected to the substantially constant head of the said body of liquid in said chamber, a second expansible and contractible means, a transparent housing communicating with, and in liquid-tight relation with, the said second expansible and contractible means, two immiscible liquids, the combined volumes of which fill said second expansible and contractible means and the said transparent housing with the junction line of the said liquids visible through said transparent housing, and leverage means operatively connecting said first and second expansible and contractible means whereby expanding movement of the first expansible and contractible means acts through said leverage means to contract said second expansible and contractible means and thereby vary the position of the junction of the two immiscible liquids in said transparent housing to indicate the level of the variable level liquid body, said leverage means being adjustable to vary the extent of movement of the second expansible and contractible means in response to a predetermined extent of movement of said first expansible and contractible means.

14. The combination set forth in claim 13 wherein said second expansible and contractible means and said transparent housing are also disposed within said first mentioned housing and said first mentioned housing is in communication and filled with the liquid of one of said bodies of liquid.

15. In a remote liquid level indicator of the type which responds to a difference in the pressure heads between a variable level liquid body and a constant level liquid body, a substantially vertically positioned transparent tube, two immiscible liquids filling said tube and having their junction line between the ends of the tube, and an inherently resilient expandible and contractible means subjected on the one side to the pressure of the constant level liquid body and on the other side to the pressure of the variable level liquid body, said resilient means being in communication with one end of the said transparent tube and the two immiscible liquids filling the space confined within said transparent tube and resilient means, said resilient means supporting the weight of the two immiscible liquids, the said inherently resilient expandible and contractible means responding to a difference in said pressure heads to vary the position of the junction of the two immiscible liquids in said transparent tube to indicate the level of the variable level liquid body.

16. The combination claimed in claim 15 wherein a transparent housing surrounds said transparent viewing tube in communication and filled with the liquid of one of the said bodies of liquid.

17. In a remote liquid level indicator of the type which responds to a difference in the pressure heads between a variable level liquid body and a constant level liquid body, a substantially vertically arranged transparent conduit, expansible and contractible means communicating with the upper end of the conduit and expansible and contractible means communicating with the lower end of the conduit, two immiscible liquids filling the space enclosed by said two expansible and contractible means and said conduit, and inherently resilient expansible and contractible means operatively connected with one of said previously mentioned expansible and contractible means, said inherently resilient expansible and contractible means being subjected on the one side to the pressure of the constant level liquid body and on the other side to the pressure of the variable level liquid body, said two bodies of liquid both being subjected to the same pressure thereon whereby as the level of the one liquid body varies the inherently resilient expansible and contractible means respond to the difference in the pressure heads of the constant and variable level liquid bodies to expand one of said first mentioned expansible and contractible means and contract the other of said first mentioned expansible and contractible means to vary the position of the junction line between the two immiscible liquids in said conduit in proportion to the variation in the difference between the constant and variable pressure heads.

18. The combination set forth in claim 17 including a housing surrounding said first, second and third mentioned expansible and contractible means and said transparent conduit, said housing having a transparent portion through which the junction line of the two immiscible liquids in said transparent conduit is visible, said housing being filled and in communication with the liquid of one of said liquid bodies.

19. The combination set forth in claim 18 wherein said housing is filled and in communication with the liquid of said constant level liquid body whereby the liquids within the housing and within the transparent conduit and the expansible and contractible means are in substantially hydrostatic balance.

LE ROY S. DE MART.

REFERENCES CITED

The following references are of record in the file of this patent:

UNITED STATES PATENTS

| Number | Name | Date |
|---|---|---|
| 813,096 | House | Feb. 20, 1906 |
| 1,256,904 | Hurlbrink | Feb. 19, 1918 |
| 2,215,660 | Brown et al. | Sept. 24, 1940 |
| 2,225,608 | Brown et al. | Dec. 24, 1940 |
| 2,286,919 | McNeill | June 6, 1942 |

FOREIGN PATENTS

| Number | Country | Date |
|---|---|---|
| 315,895 | Germany | Nov. 15, 1919 |
| 327,063 | Germany | Oct. 6, 1920 |
| 198,532 | Great Britain | June 7, 1923 |
| 234,484 | Great Britain | Oct. 15, 1925 |
| 847,533 | France | Oct. 11, 1939 |